No. 731,493. PATENTED JUNE 23, 1903.
F. B. PIERCE.
CORN HARVESTER AND HUSKER.
APPLICATION FILED MAR. 25, 1902.
NO MODEL. 4 SHEETS—SHEET 1.
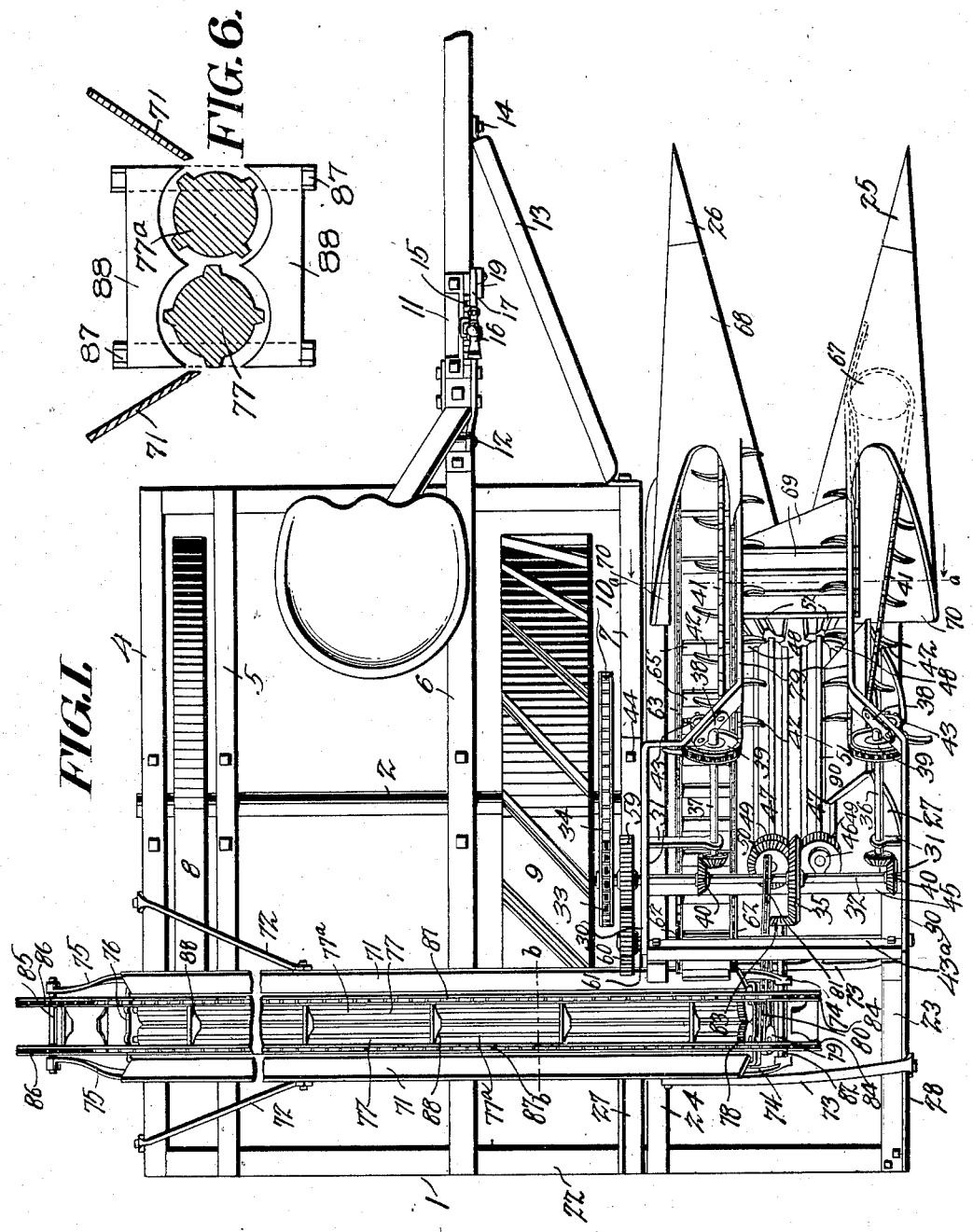
Witnesses
F. B. Pierce, Inventor.
by C. A. Snow & Co.
Attorneys

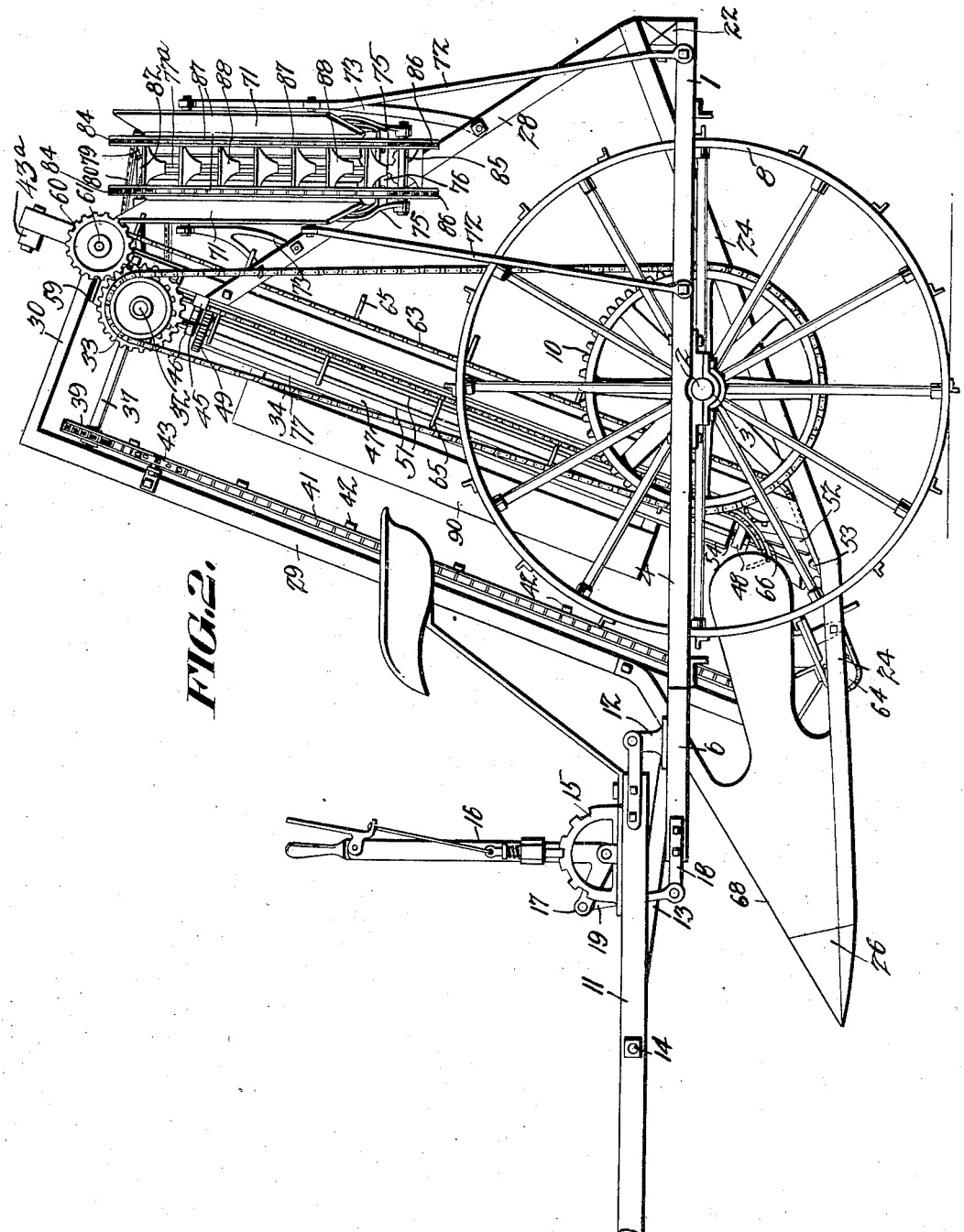

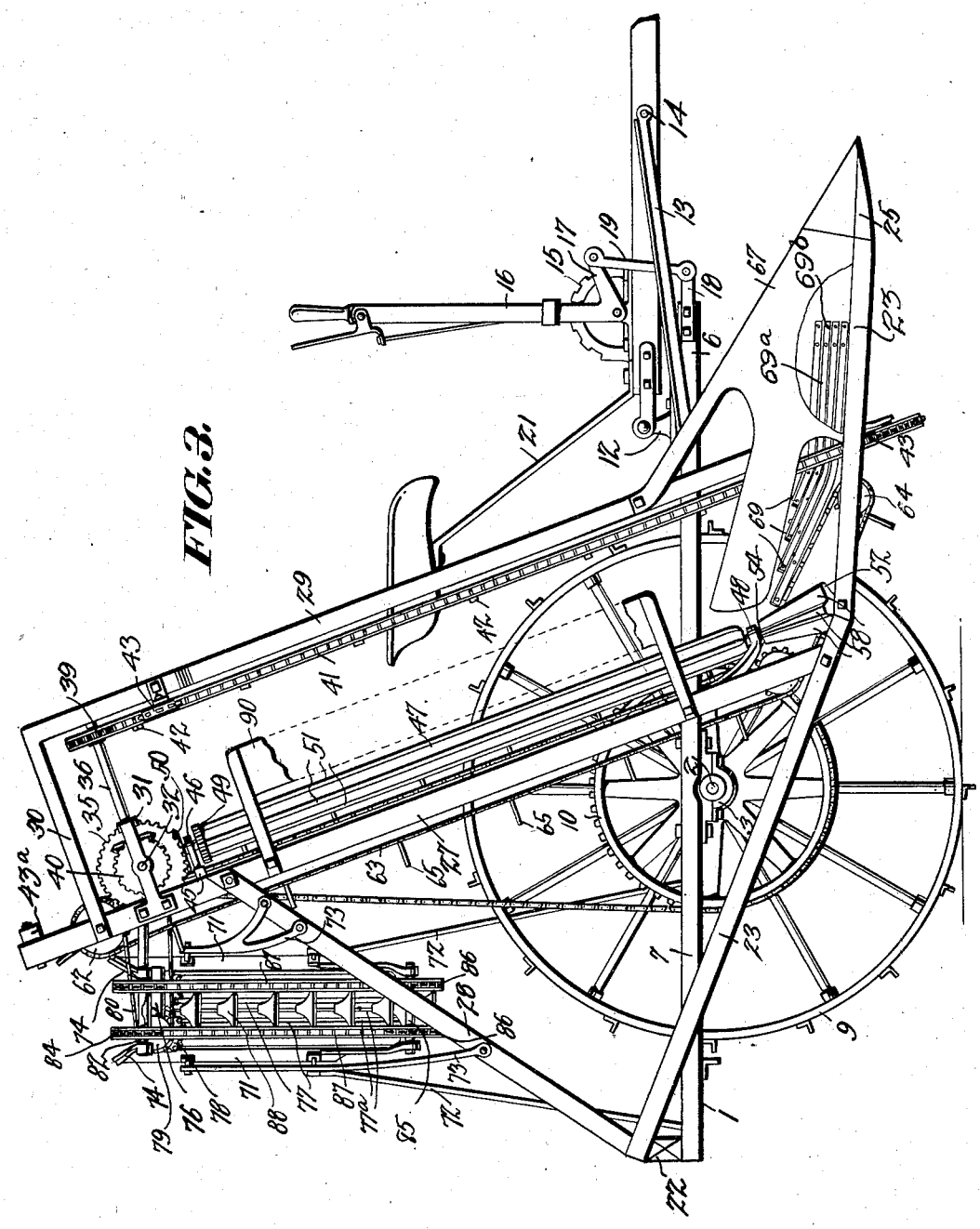

No. 731,493. PATENTED JUNE 23, 1903.
F. B. PIERCE.
CORN HARVESTER AND HUSKER.
APPLICATION FILED MAR. 25, 1902.
NO MODEL. 4 SHEETS—SHEET 4.
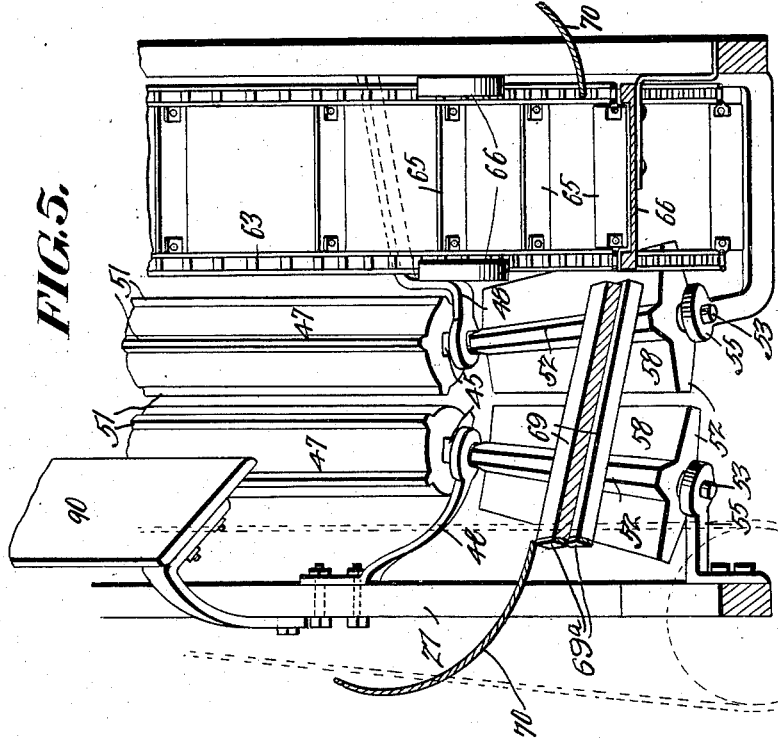
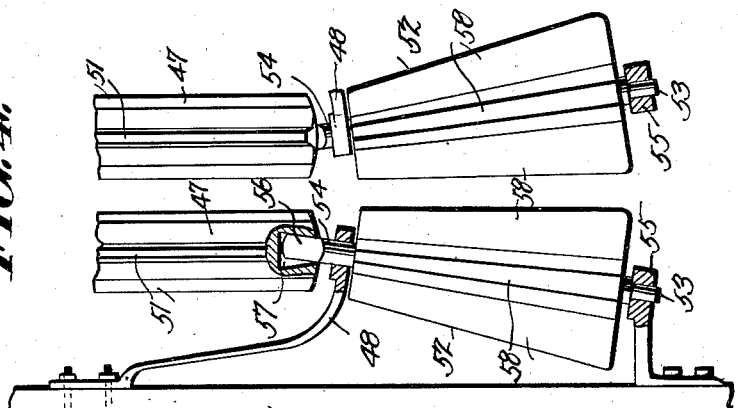

No. 731,493. Patented June 23, 1903.

UNITED STATES PATENT OFFICE.

FRANKLIN B. PIERCE, OF RIDGEFARM, ILLINOIS.

CORN HARVESTER AND HUSKER.

SPECIFICATION forming part of Letters Patent No. 731,493, dated June 23, 1903

Application filed March 25, 1902. Serial No. 99,913. (No model.)

*To all whom it may concern:*

Be it known that I, FRANKLIN B. PIERCE, a citizen of the United States, residing at Ridgefarm, in the county of Vermilion and State of Illinois, have invented a new and useful Corn Harvester and Husker, of which the following is a specification.

My invention is an improved corn harvesting and husking machine adapted for snapping off the ears of corn from standing cornstalks in the field and husking the ears; and it consists in the peculiar construction and combination of devices hereinafter fully set forth and claimed.

In the accompanying drawings, Figure 1 is a top plan view of a corn harvesting and husking machine constructed in accordance with my invention. Fig. 2 is a side elevation of the same. Fig. 3 is a similar view showing the reverse side. Fig. 4 is a detail elevation showing the snapping-rolls, feeders, and the supporting-bearings therefor. Fig. 5 is a detail transverse sectional view taken on a plane indicated by the line $a\,a$ of Fig. 1. Fig. 6 is a similar view taken on a plane indicated by the line $b\,b$ of Fig. 1.

The main frame 1 is here shown as of rectangular form and is balanced and supported upon an axle-shaft 2, which is journaled in bearings 3, that are here shown as secured under the central portions of the longitudinally-disposed bars 4 5 6 7, which comprise portions of the main frame. On the said axle-shaft are supporting-wheels 8 9. The latter is a traction-wheel and serves to rotate said axle-shaft when the machine is in motion, whereas the former is merely a supporting-wheel, and may, as shown in Fig. 2, have angle-irons on its periphery, or they may be omitted. A sprocket-wheel 10, which is the master-wheel, is secured to the axle-shaft and is disposed near the outer side of the traction-wheel 9. The rear end of the draft-tongue 11 is pivotally connected to a bearing-bracket 12, which is on the upper side of the front portion of the bar 6, which bar projects forwardly of the main frame. An obliquely-disposed bar 13 has its front end pivotally connected to the tongue 11, as by the bolt 14, and its rear end secured to one of the front corners of the main frame which I will call the "inner" corner thereof. A segment-rack 15, which is vertically disposed, is secured on the upper side of the tongue near the rear end thereof. A hand-lever 16 is fulcrumed to the said segment-rack and has at its lower end a forwardly-extending arm 17. An arm 18 is here shown as bolted to and extending forwardly from the bar 6. A link 19 is pivotally connected to the front end of said arm 18 and also to the front end of the arm 17 of lever 16. The latter has a spring-pressed locking-dog which engages the segment-rack and by means of which the lever may be secured in any desired adjustment.

It will be understood from the foregoing description that by operating the lever 16 the main frame may be tilted or inclined, as may be desired, to raise or lower the front thereof, the front end of the draft-tongue being supported by the connections between the same and the collars on the necks of the horses. The seat-supporting bar 21 is secured on the rear end of the tongue.

The rear cross-bar 22 of the frame 1 projects from one side of the said frame and on the projecting portion of said bar are bolted or otherwise secured the rear end of a pair of forwardly-extending bars 23 24, which at their front ends carry the shoes 25 26, respectively. The said bars 23 24 are spaced a suitable distance apart to enable the shoes to be driven on opposite sides of a row of standing corn. Inclined frames are connected to and rise from the bars 23 24. Each of the said inclined frames comprises an inclined bar 27, a brace-bar 28 disposed on the rear side thereof and an inclined bar 29 on the front side of and approximately parallel with the bar 27 and having a rearwardly-extending arm 30 at its upper end bolted or otherwise suitably connected to the bar 27, the lower end of the bar 29 being extended and secured to one of the bars 23 24. The said bars 27 are provided near their upper ends with bearings, as at 31, in which is journaled a counter-shaft 32. Said counter-shaft has a sprocket-wheel 33 at its inner end, which is connected by an endless sprocket-chain 34 to the master-wheel 10 on the axle-shaft. Hence said counter-shaft 32 is caused to rotate when the machine is in motion, as will be understood. Said counter-shaft 32 is further provided near the center thereof with a beveled gear-wheel 35. Shafts 36 37 are respectively journaled in extended bearing-arms with which the bearings 31 are provided and in bearings 38 on the inner sides of the outer and inner bars 29. Said shafts 36 37 are provided near their outer ends with sprocket-wheels 39, and their inner ends are connected to the counter-shaft 32 by pairs of miter-gears 40. Thereby the sprocket-wheels 39 are rotated in opposite directions by the power communicated thereto from the counter-shaft 32. Said sprocket-wheels are employed to drive endless traveling lifting-chains 41, which are provided with projecting spurs 42 and engage suitable idler-wheels 43, which are suitably mounted at points about the level of the forwardly-extending portions of the bars 23 24, and the bearings of which idler-wheels are carried by said bars. The opposing inner leads of the said lifting-chains travel upwardly and are suitably spaced apart, so that the spurs thereof which engage the cornstalks serve, if the stalks are "down," to lift the stalks in an upright position, as will be understood. The said chains 41 are disposed on the rear sides of the bars 29. The upper ends of the inclined bars 27 are connected together by a cross-bar 43ª. The inner bar 27 is in practice connected to the proximate bar 7 of the main frame 1, as at 44. A cross-bar 45 also connects the bars 27 together at a suitable distance from the upper ends thereof and is provided with bearings 46 for the upper journals of a pair of snapping-rolls 47. The lower ends of the said snapping-rolls, which are disposed at the inclination of the bars 27, are supported by yieldable bearings 48 with which said bars are provided. The said snapping-rolls have their upper ends provided with intermeshing gears 49. One of said snapping-rolls has also a beveled gear 50, which engages the beveled gear 35 on the counter-shaft 32. Hence the snapping-rolls are driven by the power of the said counter-shaft and are rotated in reverse directions, as indicated by the arrows in Fig. 1. The said snapping-rolls are disposed a suitable distance apart to permit the cornstalks to pass between them as the machine advances, and, preferably, the snapping-rolls are provided with peripheral longitudinal flutes or ribs 51, which increase the efficiency of the same in snapping off the ears of corn from the standing cornstalks.

At the lower ends of the snapping-rolls are feeders 52, which rotate therewith. The said feeders consist of a body portion that is essentially an axis of revolution and wings that radiate therefrom, the said wings being substantially truncated right-angled triangles of equal size, whereby upon the revolution of the feeders the outer edges of said feeders describe the figure of a truncated cone. These feeders are disposed with their axes at an angle with those of the snapping-rolls, the axes of the feeders diverging downwardly and forwardly, and the said feeders have their journals 53 54 respectively engaged with bearings 55 and the bearings 48. The journals 54 at the upper ends of the feeders have their upper portions so fashioned that they are angular in cross-section, and the said angular portions 56 of said journals are engaged in angular sockets 57 in the lower ends of the snapping-rolls. The said sockets 57 have downwardly-converging sides to admit of the angular disposition of the feeders with reference to the snapping-rolls, and said sockets and said angular portions of the upper journals of the feeders effect flexible connections between the feeders and the snapping-rolls, so that the former are rotated by the latter. The said feeders engage the standing cornstalks in advance of the snapping-rolls and direct the cornstalks between the snapping-rolls, and owing to the effective truncated conical form of the feeders the same assist the lifting-chains in disposing down stalks in such position that the ears will be snapped therefrom by the snapping-rolls. The ribs or wings 58 of the feeders project radially therefrom, as shown, and are narrowed upwardly, thus facilitating the operation of the feeders in directing the stalks of corn between the snapping-rolls. It will be observed in Fig. 4 that the outer edges of the wings of these feeders are approximately parallel to each other on their nearer sides. This is the result to setting their axes of revolution at approximately the same angle of divergence from the axes of the snapping-rolls as the angle made by their outer edges (if continued) and said axis of revolution, whereby the outer edges of said wings are approximately parallel to the axis of the snapping-rolls, as seen in plan, when nearest each other.

The counter-shaft 32 has a spur-gear 59 thereon, which is located near the sprocket-wheel 33 and meshes with a spur-gear 60 on a shaft 61, which shaft has its bearings near the upper ends of the bars 27. A pair of sprocket-wheels 62, which are secured on the shaft 61, operate a pair of endless traveling elevator-chains 63, which are disposed near the inner side of the inner snapping-roll. The said elevator-chains engage idler-sprockets 64, which revolve on suitable bearings, (not shown,) which are disposed on the level of the forwardly-extending portions of the bar 24. The said elevator-chains are connected together by elevator-buckets 65 and are disposed somewhat in rear of the inner snapping-roll and parallel therewith. The lower portion of the elevator-chains extend forwardly in advance of the lower ends of the snapping-rolls, and the angles thus formed in the respective leads of the elevator-chains are engaged by suitable guides 66. The function of the said elevator chains and buckets, which are hereinafter called the "elevator," is to carry up the ears of corn snapped from the cornstalks by the snapping-rolls and deliver the ears of corn onto a husking mechanism, hereinafter described.

The shoes 25 26 are respectively formed with laterally-inclined wings 67 68, which diverge upwardly and which serve initially to direct the cornstalks into the path of the snapping-rolls and to uplift the down stalks before they are reached by the feeders at the lower ends of the snapping-rolls, the said wings, feeders, and the lifting-chains 41, hereinbefore described, coacting to appropriately dispose the cornstalks and direct them between the snapping-rolls. The ears as they are snapped from the stalks either lodge in the buckets of the elevator or, if they slide downwardly on the rolls, are caught upon spring-supported gates 69, which are carried by the shoe 25 and project laterally across the space in front of the feeders 52 and are so disposed as to catch the ears of corn and deflect them laterally into the buckets of the elevator. The said spring-supported gates yield as they come in contact with the standing stalks at a point a slight distance above the ground and permit the cornstalks to pass them and enter the space between the snapping-rolls. The said shoes are further provided at their rear ends with fenders 70, which curve under them. The spring arms or fingers 69$^a$, which support the gates 69, are on the outer sides thereof, and the front ends of the said spring arms or fingers are supported on the bar 23, as at 69$^b$. (See Fig. 3.) One of said fenders is disposed to discharge onto the gates 69 and the other is disposed to discharge into the buckets of the elevator. Said fenders serve to catch such ears of corn as may be broken from the stalks before the latter are engaged by the snapping-rolls and cause such ears to be delivered onto the elevator, and hence carried by the latter to the husking mechanism, hereinafter described. The gates 69 overlap, as shown in Figs. 1, 3, and 5 of the drawings, so that the respective upper inner edges thereof serve to direct the ears of corn over said gates onto the elevator, as will be understood.

A fender 90 is supported by the bar 27 and disposed above the snapping-roller which is farthest from the elevator to prevent ears of corn from dropping from the outer side of the said roller.

I will now describe the husking mechanism, to which the ears of corn are fed by the elevator.

A pair of boards 71, which are oppositely inclined laterally, are disposed parallel with each other and transversely with relation to the main frame 1 and over the latter and are supported by suitable braces 72 73, which are respectively connected to the outer bar 4 of the main frame and to the outer inclined brace-bar 28. The said boards 71 are provided at their ends with outwardly-projecting bearings 74 75, the latter extending beyond one side of the frame 1. The said boards are further provided at their ends with transversely-disposed bearings 76, in which are journaled a pair of husking-rollers 77, which are supported in an inclined position, as indicated in Figs. 2 and 3 of the drawings. The said husking-rollers are provided at their upper ends with intermeshing gears 78, and the shaft of one of the husking-rollers is extended and provided with a sprocket-wheel 79. An endless sprocket-chain 80 connects said wheel 79 to a similar sprocket-wheel 81 on the shaft 32. Hence power is communicated from the said counter-shaft 32 to the husking-rollers, and the latter are rotated in opposite directions. A shaft 82 is journaled in the bearings 74, and the front end of said shaft is provided with a beveled pinion 83, which engages the beveled gear-wheel 35 on the counter-shaft 32. Hence said shaft 82 is rotated by power communicated thereto from said counter-shaft. A pair of sprocket-wheels 84 are secured on the shaft 82 at a suitable distance apart and within the bearings 74. A shaft 85 is journaled in the bearings 75 at the opposite end of the husking mechanism, and a pair of sprocket-wheels 86 are secured on said shaft 85 and connected by endless sprocket-chains 87 to the sprocket-wheels 84 on the shaft 82. Said endless chains 87, which are carrier-chains, are disposed on the inner sides of the boards 71, which boards form the sides of a trough, and the upper leads of the said chains operate above the husking-rollers. Said carrier-chains are connected together by flights or sweeps 88, which are transversely disposed with relation to the husking-rollers, and the said flights or sweeps on the upper leads of the said carrier-chains move outwardly on and longitudinally of the husking-rollers to carry the husked ears and discharge them from the outer lower ends of the said husking-rollers. The board 71, which is in front of the husking-rollers, has its upper portion disposed in such relation to the shaft 61, on which are the sprocket-wheels 62, over which the elevator passes, that the latter discharges the ears of corn from its buckets onto the said inclined board 71, which board deflects the ears of corn and directs them onto the husking-rollers, as will be understood. Said husking-rollers are provided with intercurrent longitudinally-disposed husking-ribs 77$^a$, which serve to strip the husks from the ears of corn, as will be understood.

Having thus described my invention, I claim—

1. A corn-harvesting machine having a pair of snapping-rolls, inclined forwardly and downwardly, and feeders at the lower ends thereof revolving therewith, said feeders being of conical contour, parallel with each other at their proximate lines.

2. In a corn-harvesting machine, a pair of snapping-rolls inclined forwardly and downwardly, and a pair of feeders at the lower ends thereof revolving therewith, said feeders consisting essentially of body portions set at angles to the axes of the snapping-rolls and truncated triangular wings radiating from said body portions.

3. In a corn-harvesting machine, the combination of a pair of snapping-rolls inclined forwardly and downwardly, fixed bearings for the upper ends thereof, yieldable supports for the lower ends of said rolls, and truncated conical feeders connected to the lower ends of said snapping-rolls, revoluble therewith, and having journals at their upper portions bearing in said yieldable supports.

4. In a corn-harvesting machine, the combination of a pair of snapping-rolls, inclined forwardly and downwardly, a pair of truncated conical feeders, the opposing sides of which are parallel and the axes of which diverge forwardly, and flexible connections between said feeders and the lower ends of said snapping-rolls.

5. In a corn-harvesting machine, the combination of a pair of snapping-rolls, inclined forwardly and downwardly, a pair of truncated conical feeders the opposing sides of which are parallel and the axes of which diverge forwardly, and angular spindle-and-socket connections between said rolls and feeders, whereby the latter are flexibly connected to and rotate with the former.

6. In a corn-harvesting machine the combination with a pair of snapping-rolls inclined forwardly and downwardly, of a pair of feeders at the lower ends thereof revolving therewith, said feeders consisting of body portions set at angles to the axes of the snapping-rolls and truncated triangular wings radiating from said body portions, and a husking mechanism at the rear of said snapping-rolls driven therewith.

In testimony that I claim the foregoing as my own I have hereto affixed my signature in the presence of two witnesses.

FRANKLIN B. PIERCE.

Witnesses:
   THOMAS MENDENHALL,
   FREMONT MENDENHALL.